United States Patent
Vance

[11] Patent Number: 6,070,363
[45] Date of Patent: Jun. 6, 2000

[54] MECHANICALLY INTERLOCKED WEATHERSTRIP

[75] Inventor: James Randall Vance, Roanoke, Ind.

[73] Assignee: Gencorp Inc., Fairlawn, Ohio

[21] Appl. No.: 09/203,898

[22] Filed: Dec. 2, 1998

Related U.S. Application Data

[63] Continuation-in-part of application No. 08/941,935, Oct. 1, 1997.

[51] Int. Cl.[7] .................................................. B60J 1/16
[52] U.S. Cl. ........................... 49/377; 49/475.1; 49/441; 277/921
[58] Field of Search ................... 49/377, 482.1, 49/490.1, 440, 475.1, 441, 374; 277/921, 906, 628; 296/146.16, 146.2, 146.9, 201; 52/716.2, 716.6, 716.7, 718.04, 204.53, 204.597

[56] References Cited

U.S. PATENT DOCUMENTS

| | | | |
|---|---|---|---|
| 3,197,935 | 8/1965 | Clancy et al. | 52/718 |
| 3,638,359 | 2/1972 | Kruschwitz | 49/490 |
| 3,742,649 | 7/1973 | Dochnahl | 49/441 |
| 3,959,941 | 6/1976 | Smith | 52/204.597 |
| 4,165,083 | 8/1979 | Dochnahl | 52/716.6 X |
| 4,349,994 | 9/1982 | Maekawa | 52/204.597 X |
| 4,358,917 | 11/1982 | Oda et al. | 52/716.5 |
| 4,614,347 | 9/1986 | Kruschwitz | 296/93 X |
| 4,750,781 | 6/1988 | Betteridge | 296/214 |
| 4,949,507 | 8/1990 | Vaughan | 49/482 |
| 5,085,005 | 2/1992 | Yasukawa et al. | 49/377 |
| 5,086,589 | 2/1992 | Dibenedetto | 49/502 |
| 5,174,066 | 12/1992 | Dupuy | 49/502 |
| 5,176,420 | 1/1993 | Kato | 296/93 |
| 5,317,835 | 6/1994 | Dupuy et al. | 49/377 X |
| 5,353,549 | 10/1994 | Henderson et al. | 49/490.1 |
| 5,396,733 | 3/1995 | Dupuy | 49/441 |
| 5,561,003 | 10/1996 | Nowosiadly | 428/99 |

FOREIGN PATENT DOCUMENTS 0 507 231 A2  10/1992  Germany.

*Primary Examiner*—Daniel P. Stodola
*Assistant Examiner*—Hugh B. Thompson
*Attorney, Agent, or Firm*—Brinks Hofer Gilson & Lione

[57] ABSTRACT

A mechanically interlocking belt weatherstrip for a motor vehicle. The weatherstrip is formed by three separate components: a cover, a body and a sealing lip. The weatherstrip may be made from separate, all-extruded components, or may be a made from a combination of molded and extruded components. The weatherstrip is formed by snapping the body and the cover snap together to hold the sealing lip securely in place. Because the cover can be easily interchanged with a different cover, the cover can be made to include properties, such as color and gloss, desired by a particular motor vehicle manufacturer while the remaining components remain unchanged. Thus, the weatherstrip allows versatility of the selection of the separate components to meet the individual style and functional needs of a particular motor vehicle design. An assembly jig and method which facilitates assembly of the cover, body and sealing lip are also disclosed.

12 Claims, 8 Drawing Sheets

6,070,363

MECHANICALLY INTERLOCKED WEATHERSTRIP

CROSS REFERENCE TO CO-PENDING APPLICATION

This patent application is a continuation-in-part of U.S. patent application Ser. No. 08/941,935 filed Oct. 1, 1997.

BACKGROUND OF THE INVENTION

1. Field of the Invention

The invention relates generally to weatherstrips for motor vehicles and more specifically to a mechanically interlocked weatherstrip for window frames of a motor vehicle.

2. Related Art

Most motor vehicles are equipped with movable windows that slide in a window opening from an up or extended position that seals off the opening to a down position, retracted within the vehicle body, that opens all or a portion of the opening and allows an exchange of air between the inside and outside of the vehicle. A sealing device broadly referred to as a weatherstrip is disposed about the periphery of the window opening and provides an air and watertight seal between the vehicle body and the window. The interface between the body and the movable window at the lower extremity of the window opening is typically equipped with a weatherstrip denominated a beltstrip which aesthetically hides the interface and provides a wiper flange or blade for cleaning the window as the window extends and retracts from the body of the vehicle.

Recently, emphasis has been placed upon vehicle streamlining for drag reduction purposes and reduction of wind noise. To achieve these goals, design considerations such as the elimination of all gaps and channels, low profile configurations, overlapping of the beltstrip or weatherstrip on the glass for wind noise reduction, as well as installation ease, serviceability and durability have greatly increased significance. Attainment of such goals depends upon the proper satisfaction and balancing of such design considerations.

Beltstrips and weatherstrips are generally extruded or roll-formed in a complicated manufacturing process having many steps. Typically, a core metal structure is formed and coated with an extruded layer of synthetic elastomeric material to form a belt molding and then is cut to length. A sealing strip having a flexible blade for contacting the window may be formed and coated in an extrusion process with rubber or similar material to form a base strip. An inner surface of the blade is generally flocked to provide a low friction coating for reducing friction between the blade and the window and to reduce the tendency of the weatherstrip and window to squeak. The sealing strip is usually affixed to the belt molding. The belt molding and the base portion of the sealing strip are usually notched at spaced locations. Clips are then inserted into the notches to affix the belt molding, sealing strip and clips. The clips also grip a flange edge formed on the door of the vehicle to hold the belt weatherstrip to the door of the vehicle.

The materials used to form the belt weatherstrip are typically a combination of thermoset elastomer or thermoplastic and thermoplastic elastomer. For example, an elastomer may be over extruded on a metal carrier and then a post assembled laminate strip of cosmetic film and metal that is roll formed into a C-configuration is mechanically fastened over a section of the front surface of the belt weatherstrip.

The requirement of cosmetic surfaces dictates that the surface area be made of specific thermoplastic, a decorative film, or consist of a painted metal while providing a seal to prevent air and water leakage. Conventional weatherstrips lack the flexibility to interchange the front surface in order to provide a different cosmetic appearance.

SUMMARY OF THE INVENTION

A mechanically interlocking belt weatherstrip for a motor vehicle. The weatherstrip is formed by three separate components: a cover, a body and a sealing lip. The weatherstrip may be made from separate, all-extruded components, or may be a made from a combination of molded and extruded components. The weatherstrip is formed by snapping the body and the cover snap together to hold the sealing lip securely in place. Because the cover can be easily interchanged with a different cover, the cover can be made to include properties, such as color and gloss, desired by a particular motor vehicle manufacturer while the remaining components remain unchanged. Thus, the weatherstrip allows versatility of the selection of the separate components to meet the individual style and functional needs of a particular motor vehicle design. An assembly jig and method which facilitates assembly of the cover, body and sealing lip are also disclosed.

It is an object of the present invention to provide a mechanically interlocking weatherstrip assembled from distinctly separate components.

It is another object of the present invention to provide a belt weatherstrip made by interlocking two separately molded thermoplastic parts and a functional elastomeric part.

It is a further object of the present invention to provide an assembly jig and method for assembling the three components, mechanically interlocked weatherstrip according to the present invention.

These and other aspects and advantages of the invention are described or apparent from the following detailed description of the preferred embodiments and appended drawings wherein like reference numbers refer to the same element, feature or component.

DETAILED DESCRIPTION OF THE PREFERRED EMBODIMENTS

Figure 1:
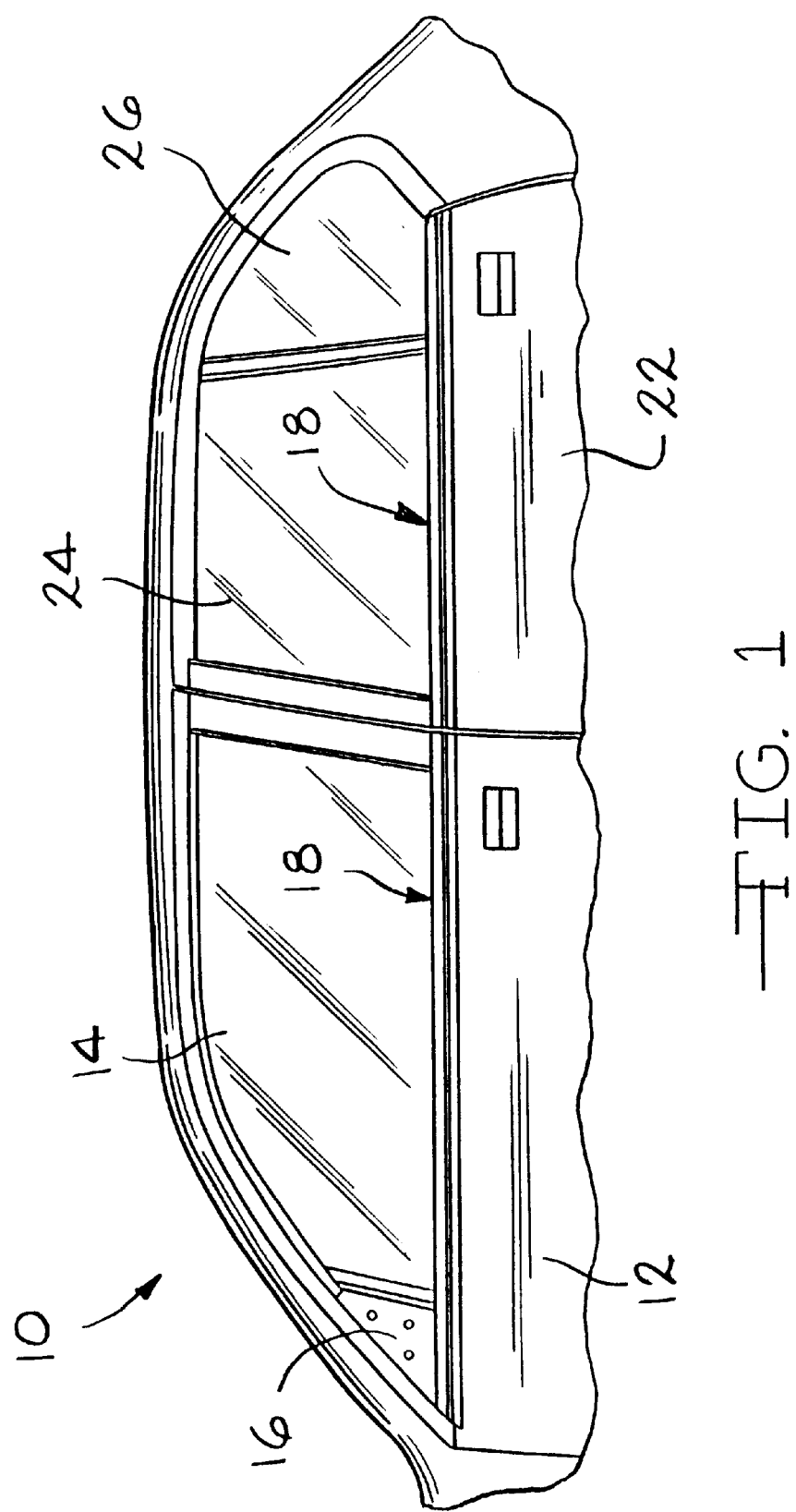
FIG. 1 is a partial side elevational view of a motor vehicle.

With reference to the drawings, FIG. 1 shows a partial side elevation of a four-door motor vehicle 10 having a front door 12 and a rear door 22, a movable front window 14 and a movable rear window 24, a mirror patch 16, a fixed window 26, and a beltstrip or weather strip 18 attached to the front door 12 at an interface between the front window 14 and the front door 12.

Similarly, the weatherstrip 18 may be attached to the rear door 22 at an interface between the rear window 24 and rear door 22. The weatherstrip 18 extends longitudinally along both the lower edge of the front window 14 and the lower edge of the rear window 24 and operates to aesthetically conceal the interface between the front door 12 and the front window 14 and the rear door 22 and the rear window 24, as well as to provide a seal for air and water leakage therebetween.

Figure 2:
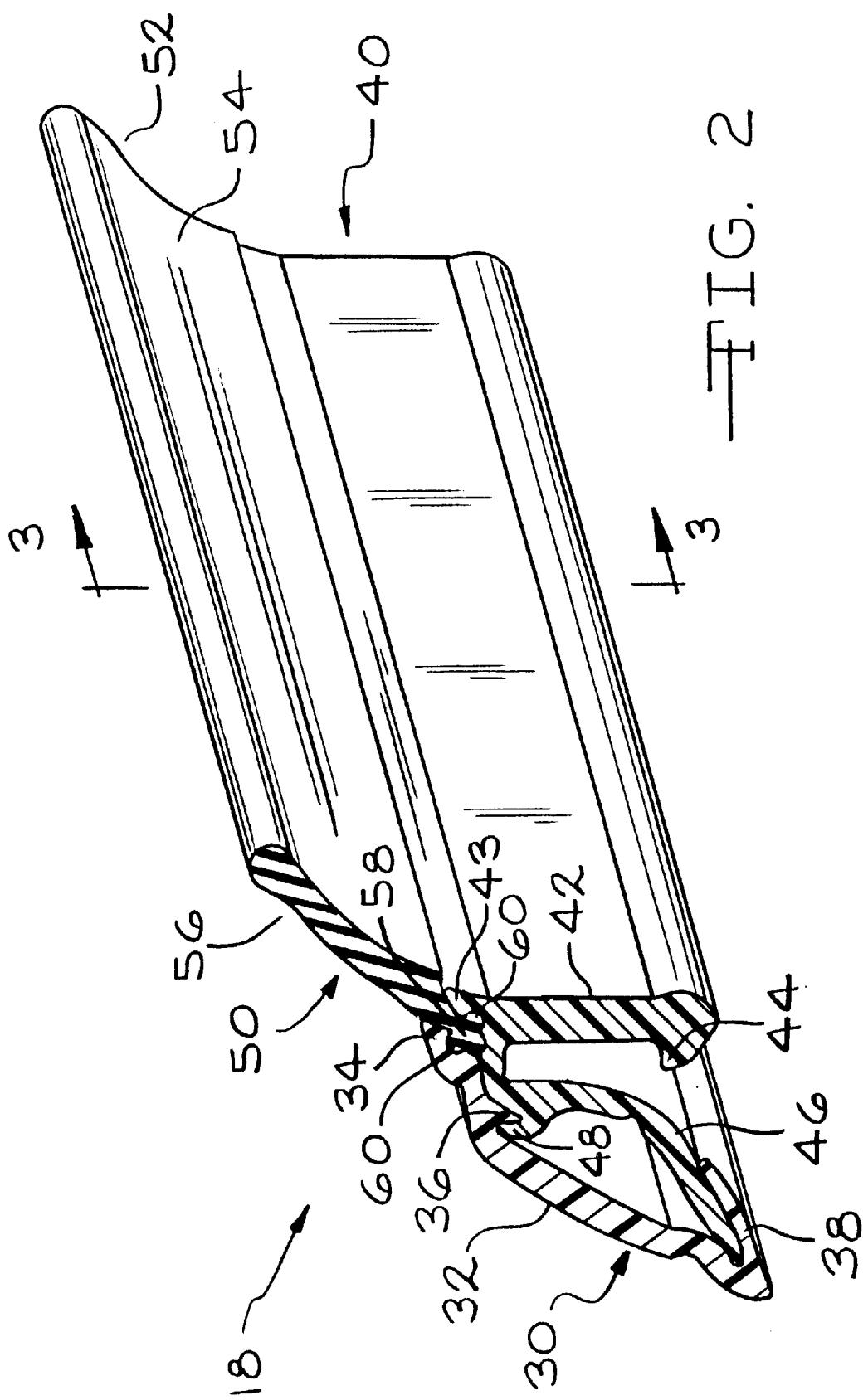
FIG. 2 is a perspective, sectional view of a weatherstrip according to a preferred embodiment of the invention.
Figure 3:
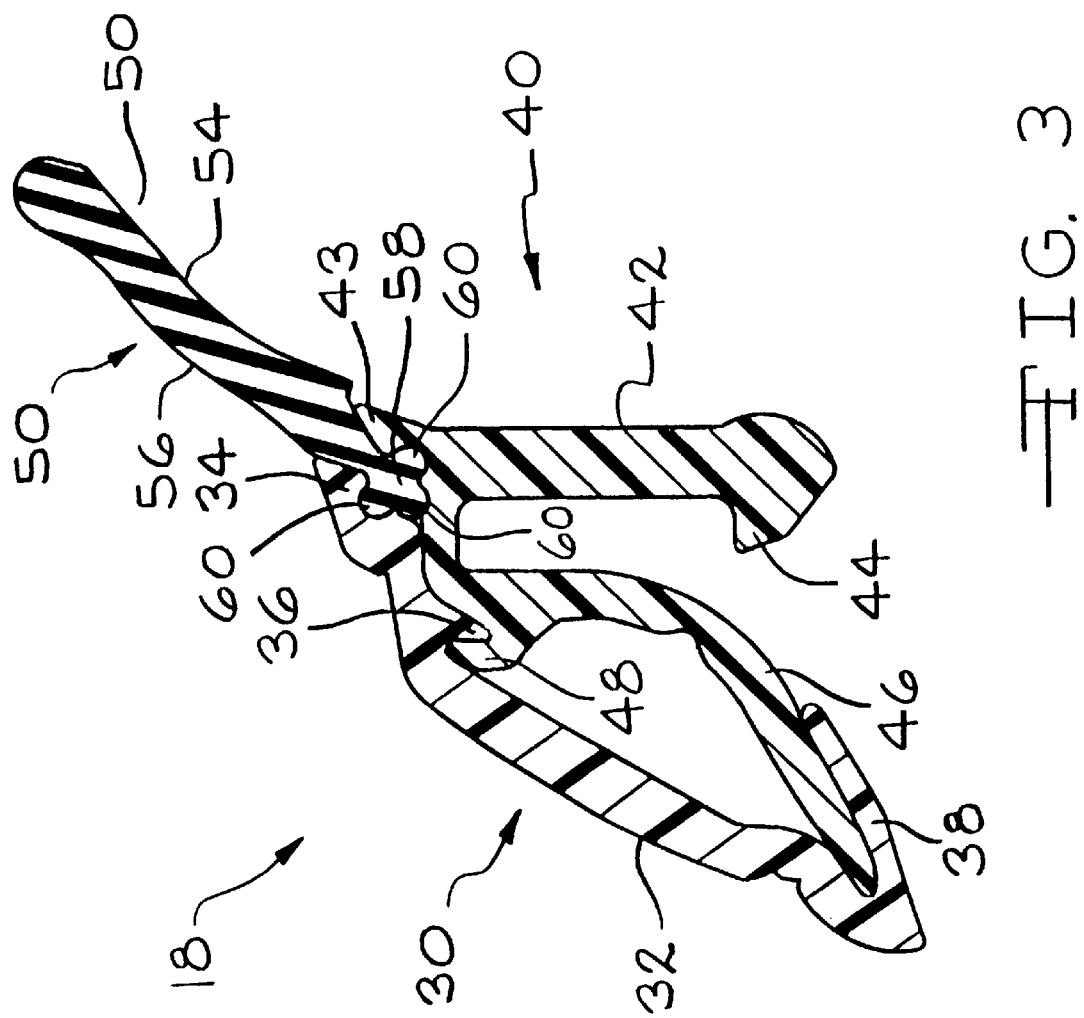
FIG. 3 is a cross-sectional view of a weatherstrip according to the preferred embodiment of the invention taken along lines 3—3 of FIG. 2.
Figure 4:
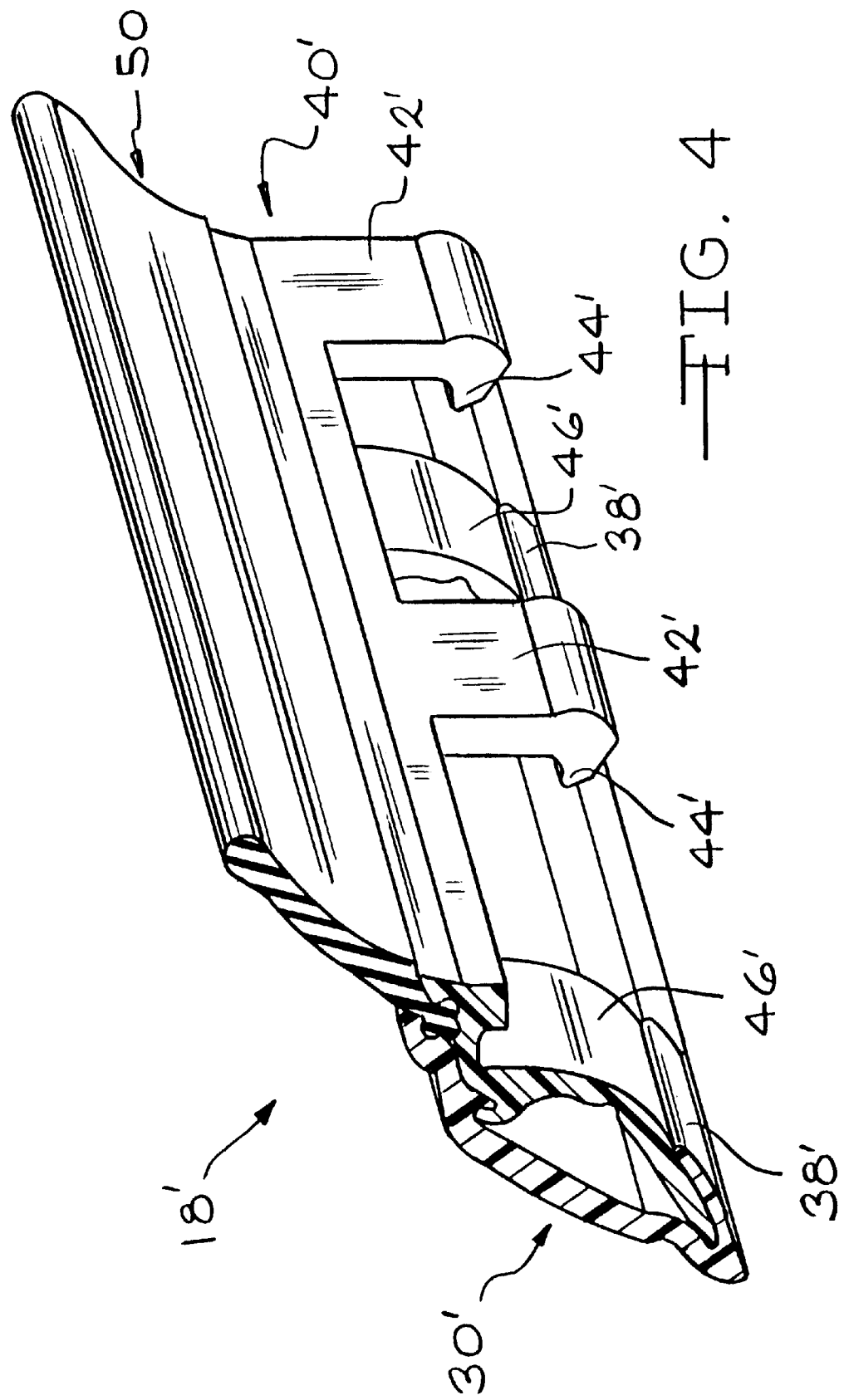
FIG. 4 is a perspective, sectional view of a weatherstrip according to an alternate embodiment of the invention.

The weatherstrip 18 of the invention is shown in FIGS. 2 through 4. The weatherstrip 18 preferably comprises three separate components: a cover 30, a body 40 and a sealing lip 50.

The cover 30 includes a side wall 32, an upper camming projection 34, a lip or struck out portion 36, and a transition portion 38.

The cover 30 serves as an outer decorative component made from material to meet color, gloss and weatherability requirements of the individual motor vehicle manufacturer. The cover 30 may be made of a wide variety of materials and may be molded or extruded using a process well-known in the art.

In the preferred embodiment, the cover 30 is made preferably of a colored, weatherable grade, acrylic-styrene-acrylonitrile polycarbonate (ASA/PC) alloy. However, the cover 30 may also be made of combinations of nylon alloy materials, such as ASA, thermoplastic (TPO), polyvinyl chloride (PVC) and the like. Also, the cover 30 may be made of a film laminated thermoplastic material, such as acrylonitrile-butadiene-styrene (ABS), polyethylene teraphthalate (PET) and polybutylene teraphthalate (PBT) and the like. In addition, the cover 30 may be made of body matched painted thermoplastic material from any variety of thermoplastic families based on ABS, PET, PBT, polyamide (nylon) (PA) and the like.

The body 40 includes a projecting portion 42 having an upper camming projection 43 and a lower camming projection 44 and a lip portion 46 having an upper camming projection 48. In the preferred embodiment, lip portion 46 is located at spaced apart locations to align with a transition portion 38 of the cover 30.

In one embodiment of FIGS. 2 and 3, the projecting portion 42 of the body 40 is formed to continuously extend longitudinally along the front window 14 or the rear window 24 of the vehicle 10.

The body 40 may be made from any inherently dimensionally stable thermoplastic material to meet dimensional stability and exterior motor vehicle requirements. In the preferred embodiment, the body 40 is made from material substantially identical to the cover 30 and may be molded or extruded. However, the body 40 may also be made from PA material, glass filled PA, and the like.

The sealing strip or lip 50 includes a blade portion 52 having a low-friction, inner sealing surface 54 and an outer surface 56 and a lower interlocking portion 58. The inner surface 54 is preferably made of a low-friction material, such as polyester flock, a low-friction coating, a low-friction film and the like. The outer surface 56 may be coated with coating or film or may be uncoated depending on design specifications.

The sealing lip 50 is preferably made of a flexible, elastomeric material, such as rubber, ethylene-propylene-diene-monomer (EPDM), Santoprene® thermoplastic elastomer (TPE) and the like. Santoprene® is a registered trademark of Advanced Elastomer Systems, L. P. of Akron, Ohio. The sealing lip 50 may be molded or extruded using a process well-known in the art.

When the weatherstrip 18 is installed on a vehicle 10, the sealing lip 50 functions as a wiper so that when the front window 14 or the rear window 24 is raised, any moisture or other residue on the window will be wiped away. The sealing lip 50 also prevents the leakage of moisture or other residue into the door panel and reduces the amount of noise transferred to the interior of the vehicle 10.

The lower interlocking portion 58 defines a plurality, preferably three, generally semi-circular projections or ribs 60 preferably oriented at right angles to one another and generally to the blade portion 52 of the sealing strip 50. Thus, the lower interlocking portion 58 in this embodiment generally has a cloverleaf-shaped cross section. The semi-circular projections 60 fit into recesses formed in the cover 30, the body 40 and a recess formed by both the cover 30 and the body 40. To mechanically interlock the above-mentioned separate components to form the weatherstrip 18, the lower interlocking portion 58 of the sealing lip 50 is positioned to abut the upper camming projection 34 of the cover 30 as shown in FIG. 3. The lip portion 46 of the body 40 is urged toward the transition portion 38 until the lip portion 46 encounters the transition portion 38. The camming projection 48 of the body 40 is urged toward the struck out portion 36 of the cover 30. The inherent resiliency of the lip portion 46 of the body 40 abutting against the transition portion 38 of the cover 30 urges the camming projection 48 upward and inward towards the struck out portion 36. As the camming projection 48 is biased towards the cover 30, an audible sound like a "click" is emitted, indicating that the body 40 is properly snapped in place. When properly snapped in place, the upper camming projection 43 of the body 40 is biased towards the upper camming projection 34 of the cover 30 to securely hold the sealing lip 50 in place and to mechanically interlock the weatherstrip or beltstrip 18.

Alternatively, the cover 30 and the body 40 may first be properly snapped in place. Then, the interlocking portion 58 may be slid longitudinally in the channel formed between the camming projection 34 of the cover 30 and the upper camming projection 43 of the body 40 to form the mechanically interlocked weatherstrip or beltstrip 18.

To securely affix the weatherstrip 18 to the vehicle 10, the lower camming projection 44 of the mechanically interlocking weatherstrip 18 may then be used to engage a portion of the front door 12 and the rear door 22, for example, the pinch weld (not shown) in a manner well-known in the art. It should be appreciated that the weatherstrip 18 may be attached to any piece of material that has a surface or edge that can be gripped by the lower camming projection 44.

It should be appreciated that the invention is not limited to the particular geometric configuration or shape of the body 40 and, in particular the projection portion 42 and the lower camming projection 44. It is envisioned that the body 40 can be adapted to a variety of cross-sectional shapes so that the weatherstrip 18 can accommodate and be installed in a wide variety of door configurations. It is also envisioned that the body 40 may also include a steel reinforcing member to provide rigidity to the body 40 by extruding EPDM material over a steel carrier using a process well-known in the art.

FIG. 4 shows an alternate embodiment of the weatherstrip or beltstrip 18'. In the alternate embodiment of the invention, the sealing lip 50 is substantially identical to the embodiment shown in FIGS. 2 and 3. However, the cover 30' shown in FIG. 4 includes a plurality of transition portions 38' that are located at spaced intervals in the longitudinal direction of the weatherstrip 18', rather than a single, continuous transition portion 38 shown in FIGS. 2 and 3. Otherwise, the cover 30' is substantially identical to the cover 30.

Likewise, the body 40' shown in FIG. 4 includes a plurality of projecting portions 42' and lower camming projections 44' are located at spaced apart locations along the longitudinal direction of weatherstrip 18', rather than a single, continuous projecting portion 42 and lower camming projection 44. Otherwise, the body 40' is substantially identical to the body 40.

As readily apparent from FIG. 4, each transition portion 38' of the cover 30' aligns vertically with each projection portion 46' of the body 40' along the length of the weatherstrip 18. It should be appreciated that the weatherstrip 18' contains a sufficient number of projecting portions 42' and lower camming projections 44' to properly attach the weatherstrip 18' to the vehicle 10 in a manner similar to the weatherstrip 18. The cover 30', the body 40' and the sealing lip 50 may be assembled in the same manner as the cover 30, the body 40 and the sealing lip 50 of the weatherstrip 18 as described above to form the mechanically interlocked weatherstrip 18'.

Figure 5:
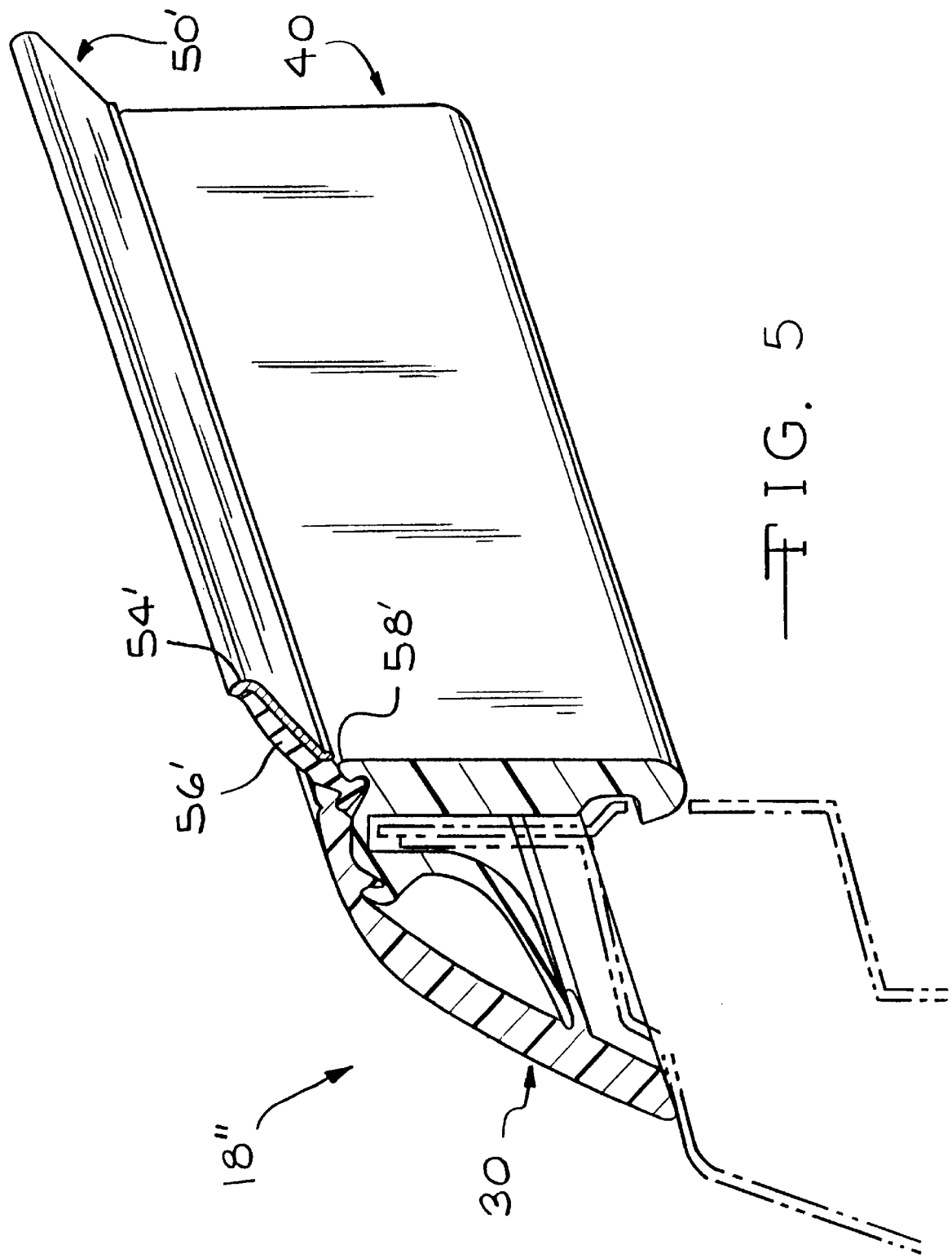
FIG. 5 is a perspective, sectional view of a weatherstrip according to a second alternate embodiment of the invention.

FIG. 5 shows a second alternate embodiment of the weatherstrip or beltstrip 18". In this alternate embodiment, the cover 30 and the body 40 are substantially identical to weatherstrip 18 of FIGS. 1 through 3. However, the sealing lip 50 with the lower interlocking portion 58 having a clover-leaf cross-sectional shape is replaced with a sealing lip 50' with a lower interlocking portion 58' having an elongate cross-sectional shape. The sealing lip 50' also includes an outer surface 56' and an inner surface 58' with a flock-like coating similar to the other embodiments of the invention. The cover 30, the body 40 and the sealing lip 50' may be assembled in the same manner as the cover 30, the body 40 and the sealing lip 50 of the weatherstrip 18 as described above to form the mechanically interlocked weatherstrip 18".

It should be readily apparent that the cover 30 and the body 40 of the weatherstrip 18" may be replaced with the cover 30' and the body 40' of the weatherstrip 18'. It should also be readily apparent that the weatherstrip 18" can be attached to the vehicle 10 in a manner similar to the other embodiments of the invention.

In view of the foregoing, it should be understood that the invention allows versatility of the selection of the separate components to meet the individual style and functional needs of a particular motor vehicle design. In addition, the invention may be made from separate, all-extruded components, or may be a made from a combination of molded and extruded components to provide the most cost-effective method of manufacturing.

Figure 6:
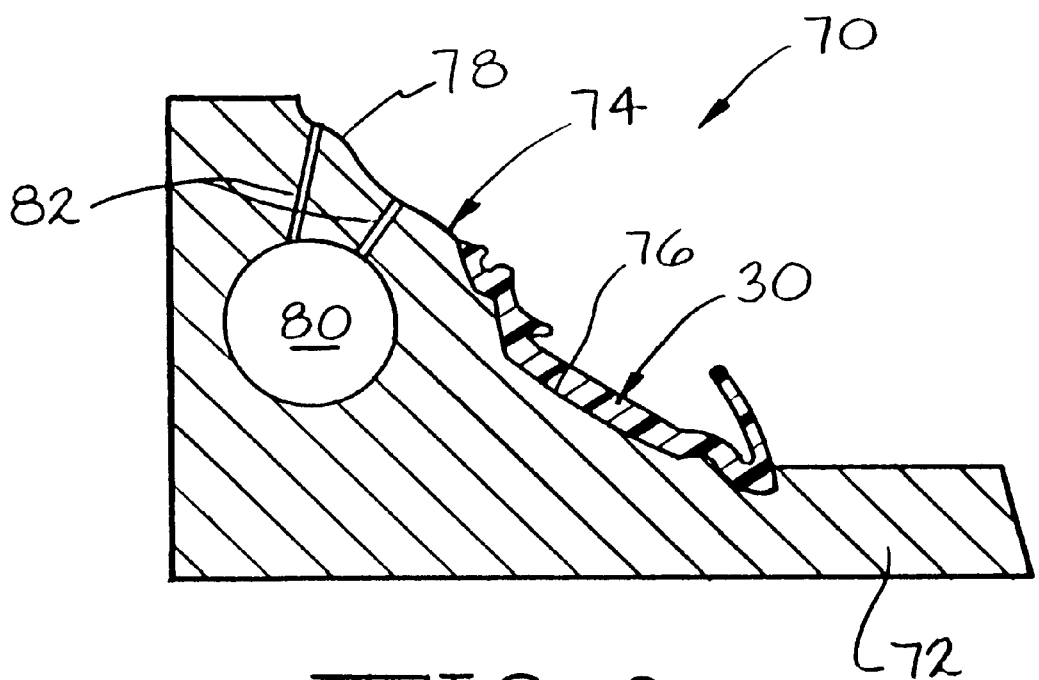
FIG. 6 is a full, sectional view of an assembly jig or press with a cover of a weatherstrip according to the present invention disposed therein.
Figure 7:
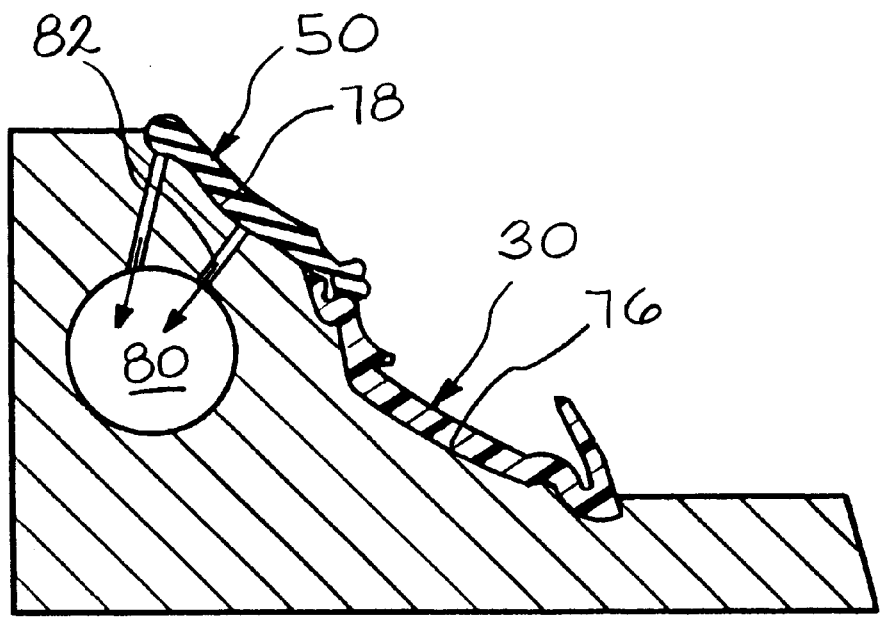
FIG. 7 is a full, sectional view of an assembly jig or press with a sealing lip and cover according to the present invention disposed therein.

Referring now FIGS. 6 and 7, an assembly jig or press 70 especially suited for assembly of the preferred and alternate embodiment weatherstrip assemblies is illustrated. The assembly jig or press 70 includes a die 72 of indefinite length having a contoured surface region 74. The contoured surface region 74 includes a lower contoured portion 76 and an upper contoured portion 78. The lower contoured portion 76 receives the cover 30 of the weatherstrip assembly 18. It should be appreciated that the die 72 and the contoured surface region 74 define sufficient length to accept at least a complete beltstrip 18 of typical length, that is, at least about 3 feet. As illustrated in FIG. 6, the lower contoured portion 76 mimics the size and contours of the cover 30 such that it is accurately received in a defined, repeatable position within the die 72.

The die 72 also includes a passageway 80 which extends along the length of the die 72 and with which communicates with a plurality of vent tubes 82 which are spaced axially along the full length of the passageway 80 and the die 72 and extend to the upper contoured portion 78. The upper contoured portion 78 mimics the size and contours of the sealing lip 50 such that it is accurately received in a defined, repeatable position within the die 72. A vacuum is drawn in the passageway 80 and this reduced pressure facilitates placement and retention of the sealing lip 50 on the upper contoured portion 78 of the contoured surface region 74. Again, the upper contoured portion 78 of the contoured surface region 74 is of sufficient length to accept any typical length of the sealing lip 50, that is, at least about 3 feet.

Figure 8:
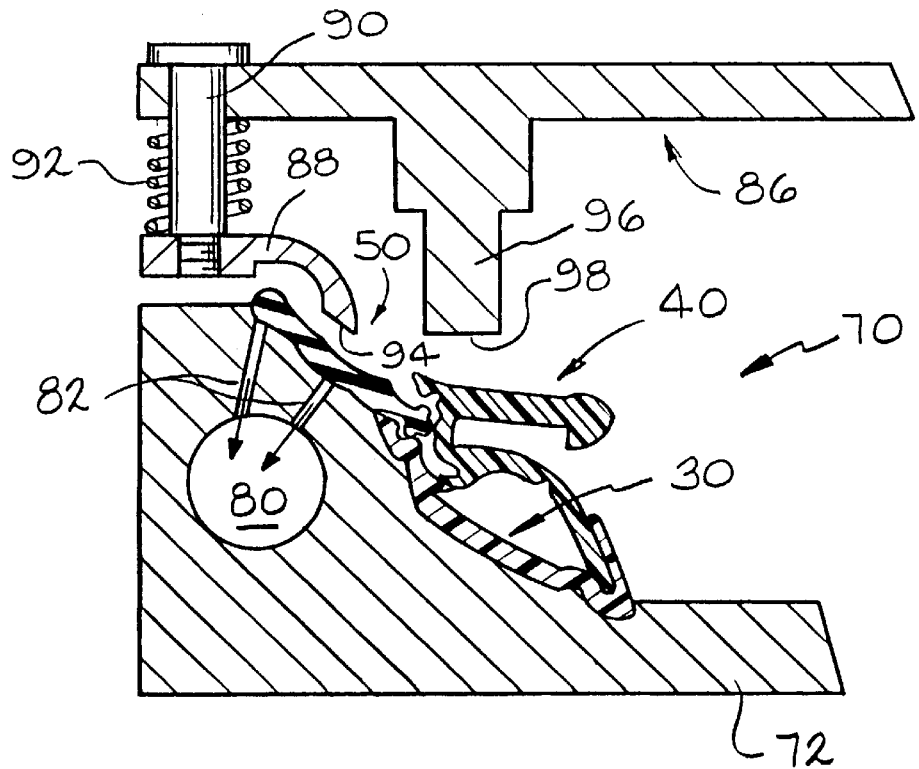
FIG. 8 is a full, sectional view of an assembly jig or press with a sealing lip, cover and body of a weatherstrip according to the present invention disposed therein in preassembly configuration.

Turning now to FIG. 8, the assembly press or jig 70 also includes a vertically and bi-directionally moveable press arm or plate 86 having an independently moveable retaining cantilever 88. The retaining cantilever 88 is disposed on a plurality of captive pins 90 and biased toward the die 72 by a like plurality of compression spring 92. The captive pins 90 and the compression springs 92 are arranged as illustrated and spaced apart along the length of the press plate 86 and the die 72. The cantilever 88 includes a terminal surface 94 configured to conform to the backside of the sealing lip 50. The press plate 86 also includes a compression or assembly bar 96 having a terminal surface 98 which extends along the length of the press plate 86 and the die 72. As the press plate 86 advances downwardly, the terminal portion 94 of the cantilever 88 engages and provides resilient force to clamp the sealing lip 50 against the upper contoured portion 78 of the contoured surface region 74.

Figure 9:
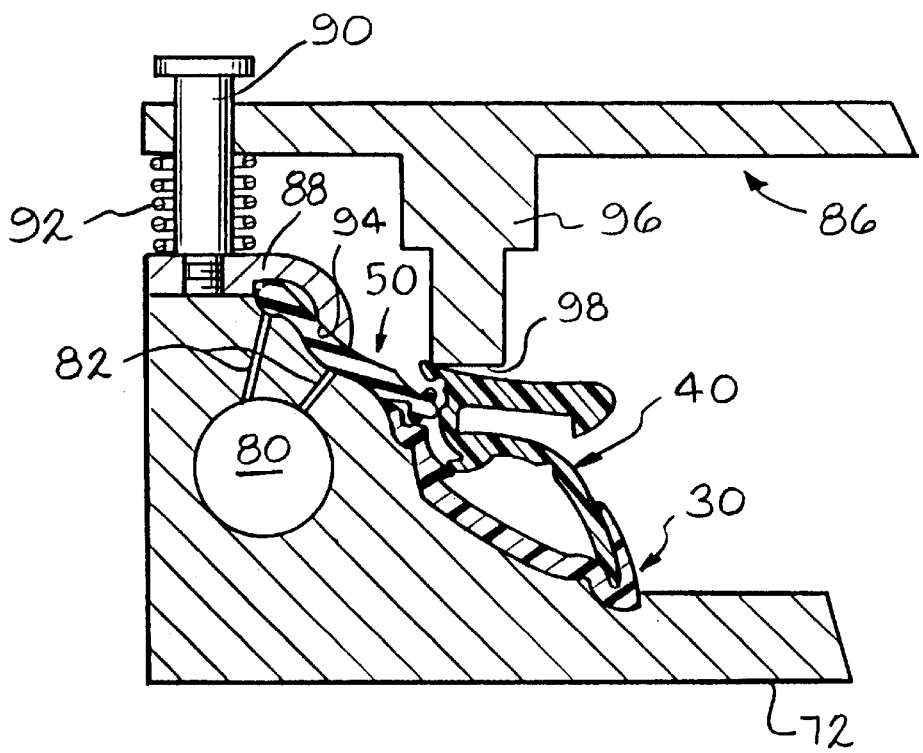
FIG. 9 is a full sectional view of an assembly jig or press with the sealing lip, cover and body of a weatherstrip according to the present invention disposed and partially clamped therein.

Turning now to FIG. 9, the press plate 86 continues to advance downwardly toward the die 72. The cantilever 88 provides increasing retaining pressure on the sealing lip 50 to retain it on the upper contoured portion 78. The terminal surface 98 of the assembly bar 96 then contacts the body 40 and begins to compress it and drive it against the cover 30.

Figure 10:
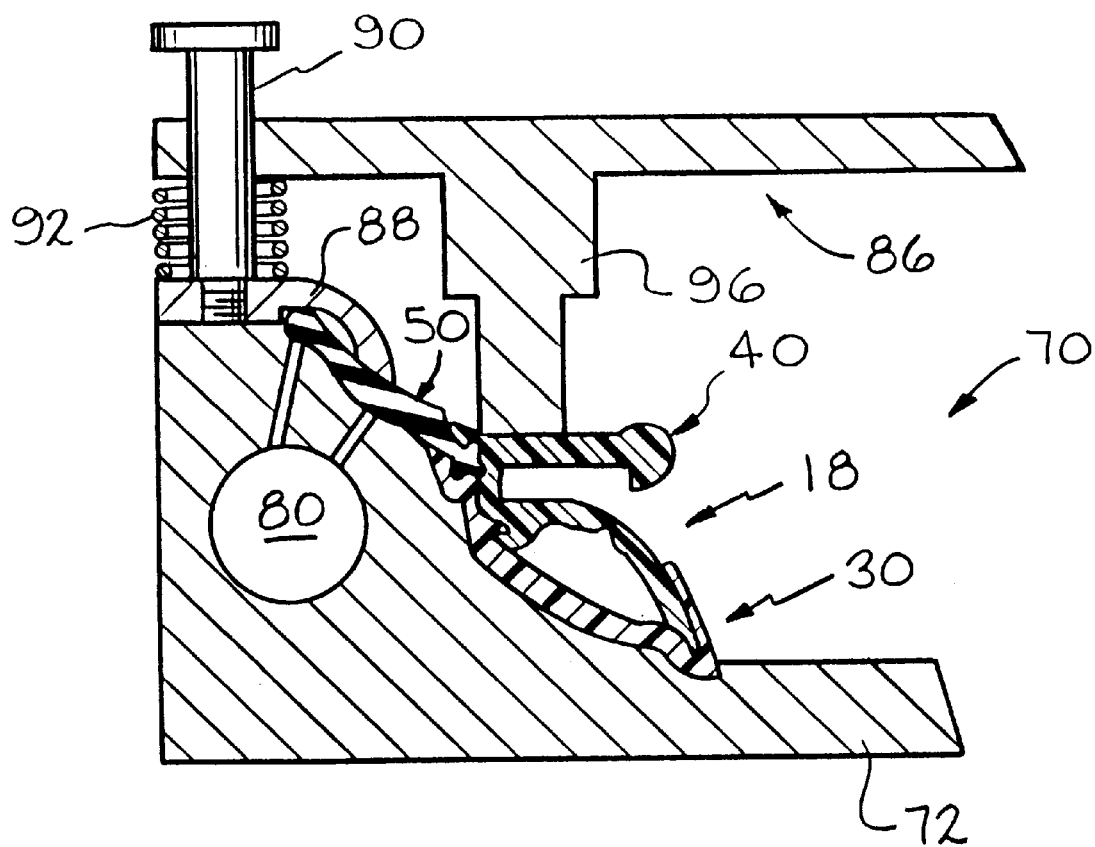
FIG. 10 is a full, sectional view of an assembly jig or press with the sealing lip, cover and body of a weatherstrip according to the present invention in assembled configuration.

Turning finally to FIG. 10, it will be appreciated that the press plate 86 and particularly the terminal surface 98 of the assembly bar 96 has advanced sufficiently so that the components of the body 40 are aligned and the complementarily configured portions of the cover 30 and the sealing lip 50 are latched and retained in intimate assembly. The weatherstrip assembly 18 is now fully assembled along its entire length. At this time, the motion of the press plate 86 is reversed, the vacuum in the channel 80 is terminated and the assembled weatherstrip 18 may be removed from the die 72. The assembly process may then be repeated with additional components.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. A belt weatherstrip for a motor vehicle, comprising:

a cover including a camming projection, a struck out portion, a transition portion and a sidewall disposed between said struck out portion and said transition portion;

a body including a projecting portion with a first upper camming projection and a lip portion with a second upper camming projection; and a sealing lip including a lower interlocking portion, wherein the first upper camming projection of the body and the camming projection of the cover engage the lower interlocking portion of the sealing lip, the lip portion of the body engages the transition portion of the cover and the second upper camming projection of the lip portion of the body engages the struck out portion of the cover.

2. The weatherstrip of claim 1, wherein said cover and said body are made of thermoplastic material and said sealing lip is made of elastomeric material.

3. The weatherstrip of claim 1, wherein said body further includes a lower camming projection.

4. A weatherstrip for a motor vehicle, comprising:

a cover including a camming projection, a struck out portion, a transition portion defining a channel and a sidewall disposed between said struck out portion and said transition portion;

a body including a retaining portion, an upper camming projection, a lip portion and a lower camming projection; and a sealing lip including a lower interlocking portion, wherein the upper camming projection of the body and the camming projection of the cover engage the lower interlocking portion of the sealing lip, the lip portion of the body engages the channel of the transition portion of the cover and the lower camming projection of the body engages the struck out portion of the cover.

5. The weatherstrip of claim 4 wherein said lower interlocking portion of the sealing lip defines a cloverleaf.

6. The weatherstrip of claim 4 wherein the struck out portion of the cover and the lower camming projection of the body are complementary.

7. The weatherstrip of claim 4 wherein the retaining portion of the body defines a latch.

8. The weatherstrip of claim 4 wherein said cover and said body are made of thermoplastic material and said sealing lip is made of elastomeric material.

9. A weatherstrip for a motor vehicle, comprising:

a cover including a camming projection, a struck out portion, a U-shaped transition portion and a sidewall disposed between said struck out portion and said transition portion;

a body including a latch portion, an upper camming projection, a lip portion and a lower camming projection; and a sealing lip including a lower engageable portion, wherein the upper camming projection of the body and the camming projection of the cover engage the lower engageable portion of the sealing lip, the lip portion of the body engages the U-shaped transition portion of the cover and the lower camming projection of the body engages the struck out portion of the cover.

10. The weatherstrip of claim 9 wherein said cover and said body are made of thermoplastic material and said sealing lip is made of elastomeric material.

11. The weatherstrip of claim 9 wherein said lower engageable portion of the sealing lip defines a cloverleaf.

12. The weatherstrip of claim 9 wherein the struck out portion of the cover and the lower camming projection of the body are complementary.

* * * * *